United States Patent [19]

Hale et al.

[11] Patent Number: 4,864,411
[45] Date of Patent: Sep. 5, 1989

[54] ELECTRONIC COPY BOARD SYSTEM

[75] Inventors: William J. Hale, Dayton; Bruno J. Paganini, Centerville, both of Ohio

[73] Assignee: NCR Corporation, Dayton, Ohio

[21] Appl. No.: 202,604

[22] Filed: Jun. 6, 1988

[51] Int. Cl.$^4$ ............................................... H04N 1/12
[52] U.S. Cl. .................................... 358/494; 358/496; 358/498; 358/296
[58] Field of Search ............... 358/285, 293, 294, 296, 358/256

[56] References Cited

U.S. PATENT DOCUMENTS

| | | | |
|---|---|---|---|
| 2,168,048 | 8/1939 | Skellett | 178/20 |
| 2,168,049 | 8/1939 | Skellett | 178/20 |
| 3,111,646 | 11/1963 | Harmon | 340/146.3 |
| 3,127,588 | 3/1964 | Harmon | 340/146.3 |
| 3,133,266 | 5/1964 | Frishkopf | 340/146.3 |
| 3,543,240 | 11/1970 | Miller et al. | 340/172.5 |
| 3,618,029 | 11/1971 | Graven | 340/172.5 |
| 3,668,312 | 6/1972 | Yamamoto et al. | 178/6.8 |
| 3,673,579 | 6/1972 | Graven | 340/173 |
| 4,060,915 | 12/1977 | Conway | 35/9 |
| 4,275,395 | 6/1981 | Dewey et al. | 340/706 |
| 4,371,893 | 2/1983 | Raheisen | 358/93 |
| 4,501,931 | 2/1985 | Ohya et al. | 178/18 |
| 4,516,156 | 5/1985 | Fabris et al. | 358/85 |
| 4,581,483 | 4/1986 | Ralston | 178/18 |
| 4,670,794 | 6/1987 | Araki | 358/285 |
| 4,707,747 | 11/1987 | Rockwell | 358/293 |
| 4,711,977 | 12/1987 | Miyamori et al. | 178/18 |
| 4,713,698 | 12/1987 | Takahashi | 358/296 |
| 4,725,889 | 2/1988 | Yaniv | 358/285 |
| 4,739,414 | 4/1988 | Pryor | 358/285 |
| 4,751,584 | 6/1988 | Midorikawa | 358/293 |
| 4,760,465 | 7/1988 | Yamazaki | 358/285 |
| 4,792,859 | 12/1988 | Wicker | 358/294 |
| 4,797,107 | 1/1989 | Hatta | 358/285 |
| 4,819,078 | 4/1989 | Tadokoro et al. | 358/256 |

OTHER PUBLICATIONS

Advertising Brochure by Zerox Corp., no date, identified as NPA.
Advertising Brochure by Zerox Corp., no date, identified as CF54.

Primary Examiner—Howard W. Britton
Attorney, Agent, or Firm—Wilbert Hawk, Jr.; Albert L. Sessler, Jr.; Elmer Wargo

[57] ABSTRACT

An electronic copy board system including an electronic copy board. The electronic copy board includes an opaque planar member which provides a support for a transparent sheet upon which image data is written. A guide member houses an elongated light to direct light through a slot in the guide member towards an array of light detectors positioned opposite the elongated light. The transparent sheet is moved between the light guide and the light detectors when the image data on the transparent sheet is to be read. In one embodiment, the transparent sheet is in the form of an endless belt, and in another embodiment, the transparent sheet is in the form of a long strip which is pulled off a supply roll and wound up on a take-up roll during the reading process. The electronic copy board is coupled to a personal computer to facilitate displaying, printing, storing, transmitting, or further processing of the visual data read from the copy board.

18 Claims, 5 Drawing Sheets

ELECTRONIC COPY BOARD SYSTEM

BACKGROUND OF THE INVENTION

This invention relates to an electronic copy board system and a new electronic copy board for use therewith.

Recently, a new product has been introduced in the field of office appliances, and this product has been referred to as an Electronic Copy Board or ECB. The purposes of the ECB are to provide a large writing surface similar to a "blackboard" or a "presentation board" which can receive drawings, numbers, or other image data, and, generally, to convert the image data on the ECB to a reduced replica or hard copy sheet of paper. Generally, the ECB has a printer associated with it to provide the hard copies of the image data written on the ECB to participants at a meeting, for example. In general, the image data is written on the ECB with marking pencils, for example, to enable the written data on the ECB to be erased where feasible.

One prior art ECB utilizes a white opaque endless loop for the writing surface, with the endless loop being supported by a pair of rollers. A stationary, linear array of photodetectors is positioned on one side of the endless loop, and a source of light is also positioned on the same side of the loop to direct light at the image data on the writing surface. The image data reflected from the writing surface passes to the array of photodetectors to "read" this data. One of the rollers supporting the loop is driven to present the image data to the array of photodetectors for sequential reading of successive columns of image data. The length of the array of photodetectors is essentially the same as the height of the useful writing area of the ECB. A problem with this type of ECB is that it is difficult to get a sufficient amount of light onto the writing surface because the photodetectors have to be close to the surface of the writing area in order to read effectively.

A second variation in a prior art ECB relates to one which does not use an endless sheet of writing material but which uses a strip of opaque material which is supplied from a "feed roll". A "take-up roll" is used to pull the strip past the array of photodetectors to effect the reading of the image data as previously described. Generally, a first motor is required for the feed roll and a second motor is required for the take-up roll, thereby increasing the cost compared to the first variation mentioned in the previous paragraph. This second variation also suffers from the same reading difficulties mentioned with regard to the first variation.

SUMMARY OF THE INVENTION

An object of this invention is to produce an ECB which facilitates the reading of image data stored thereon.

Another object of this invention is to provide a means for expanding the function of an ECB by coupling an ECB to a personal computer, for example, so as to enable the images read from the ECB to be displayed on a display, printed on a printer, stored on a storage device, like a disk, or transmitted to other locations via a MODEM, for example.

In one aspect of the invention, the ECB made according to this invention includes: a planar member, a substantially transparent sheet for receiving visual data thereon, with the planar member providing a support for the substantially transparent sheet, a source of light and a plurality of light detectors positioned in opposed relation to the source of light, moving means for moving the substantially transparent sheet between the source of light and the plurality of light detectors to read the visual data on the substantially transparent sheet, and a guide member for guiding the substantially transparent sheet to the plurality of light detectors.

In another aspect of this invention, this invention relates to a system which includes: an electronic copy board comprising: a planar member, a substantially transparent sheet for receiving visual data thereon, with the planar member providing a support for the substantially transparent sheet, a source of light, reading means for reading the visual data on the substantially transparent sheet, the reading means including a plurality of light detectors positioned in opposed relation to the source of light, and moving means for moving the substantially transparent sheet between the source of light and the plurality of light detectors to read the visual data on the substantially transparent sheet, the system further comprising: a printer for printing at least the visual data read from the substantially transparent sheet, a display monitor for displaying at least the visual data read from the substantially transparent sheet, and control means for controlling the operation of the reading means, printer, display monitor, and the moving means, the moving means including a guide member positioned between the source of light and the plurality of light detectors to enable the substantially transparent sheet to be supported on the guide member as the sheet is moved between the source of light and the plurality of light detectors.

Some advantages of the ECB of this invention are that it is easy to manufacture and substantially inexpensive in cost.

An advantage of the system of this invention is that the ECB is used as an input device to a personal computer (PC). Because the PCs may have a plurality of peripheral devices attached to them, the image data from the ECB may be processed further through the use of printers, plotters, discs, mouse devices, light pens, and the like. Also, because a personal computer is used for controlling the ECB of this invention, a separate, specialized control system is not needed, making the ECB of this invention cheaper to manufacture than prior art systems as previously stated.

These advantages, and others, may be more readily understood in connection with the following specification, claims, and drawing.

DETAILED DESCRIPTION OF THE INVENTION

Figure 1:
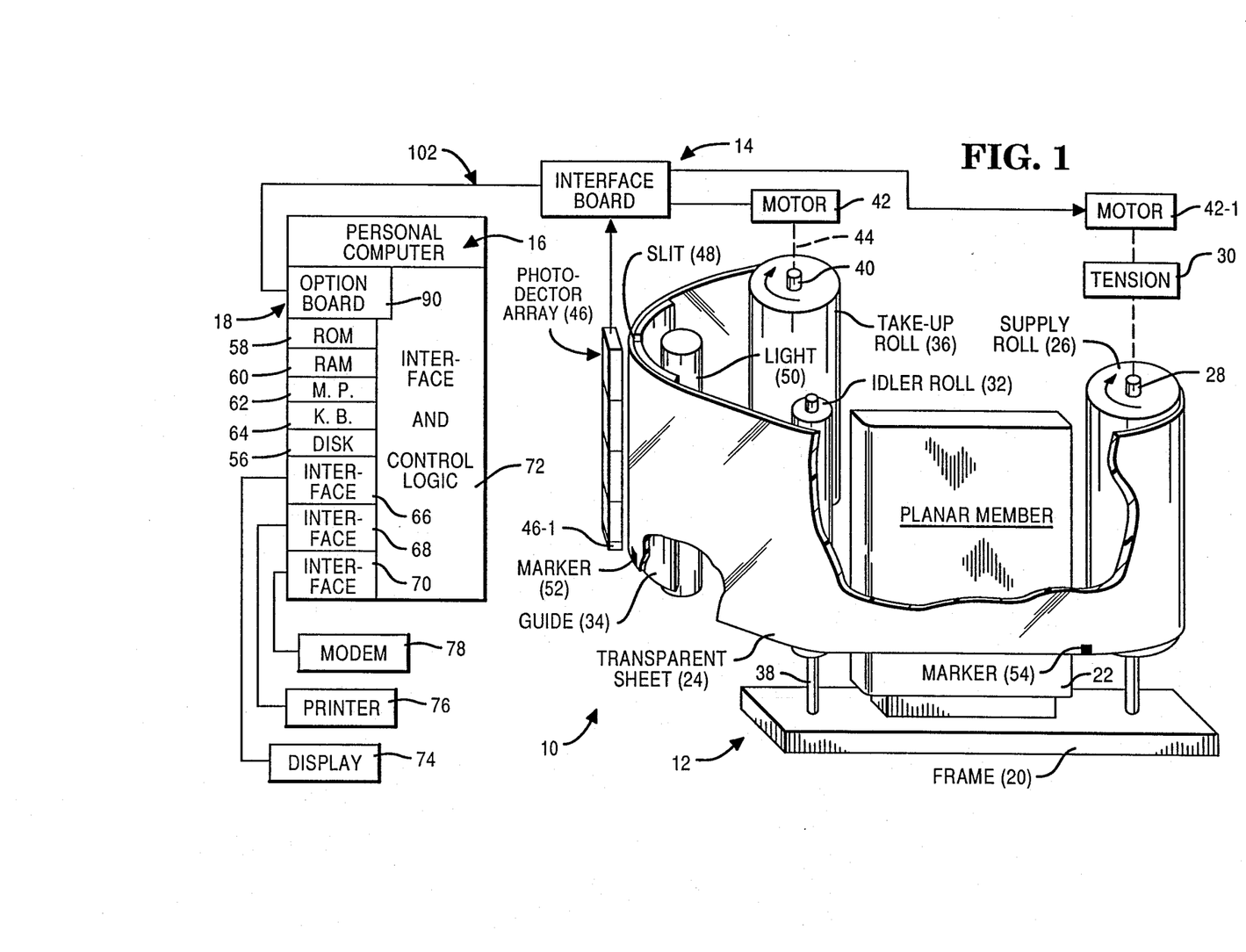
FIG. 1 is a general schematic view of a preferred embodiment of the system according to this invention, showing a first embodiment of an ECB, which uses a transparent sheet as the surface to be written upon, being coupled to a personal computer.

FIG. 1 is a general schematic view of a preferred embodiment of the system 10 made according to this invention. The system includes the Electronic Copy Board (ECB), designated generally as 12, the interface board 14, the Personal Computer (PC) 16, and an option board 18 which is housed in the PC 16.

In use, the system 10 may be set up in a conference room, for example, with the ECB 12 facing the participants in a meeting. The ECB can be constructed in a variety of sizes. For example, a popular size for the ECB 12 is about the size of conventional "flip charts" used in meetings. A conventional frame 20 (shown only schematically in FIG. 1) is used to support the planar member 22 at a height which facilitates writing on the ECB 12. The writing performed by a user of the ECB 12 is actually done on a substantially transparent sheet 24 which overlies the planar member 22. In the embodiment described, the planar member 22 has a smooth planar surface and is colored an opaque white to provide a background for the visual data written on the transparent sheet 24. The writing is effected by colored marking pencils. If the image data written on the ECB 12 is to be erased, the marking pencils may be of the grease type which facilitate erasing with a cloth, for example.

The ECB 12 (FIG. 1) has certain elements which are exaggerated in size so as to facilitate a showing of the ECB. For example, the planar member 22 is large enough to accommodate a writing surface which is 30 inches wide and 24 inches high in the embodiment described, although other sizes could be used with this invention. The transparent sheet 24 is supplied in a long continuous strip (containing several writing areas) which is withdrawn from the supply roll 26. The supply roll 26 is rotatably supported in the frame 20 and is positioned relative to the planar member 22 so that the transparent sheet 24 is supported by the planar member 22 during writing. The upper end of the supply roll 26 is also supported in the frame 20; however, the supporting shaft 28 has an adjustable tension member 30 associated with it to provide some drag on the supply roll 26 to help keep the transparent member taut on the planar member 22. The tension member 30 is conventional and may take the form of a bearing, for example, whose drag or friction is adjustable.

The transparent sheet 24 (FIG. 1) is also supported by the idler roll 32, the guide 34, and the take-up roll 36. The idler roll 32 has the ends of its supporting shaft 38 rotatably supported in the frame 20, and the supporting shaft 40 of the take-up roll 38 is similarly supported in the frame 20. A motor 42 is operatively coupled to the shaft 40, via a conventional pulley and belt shown as dashed line 44, to rotate the take up roll 36 in a clockwise direction (as viewed in FIG. 1) to move the transparent sheet 24 past the photodetector array 46 to effect reading of the image data on the transparent sheet 24 as will be described hereinafter.

The guide 34 (FIG. 1) is generally arcuately-shaped and is supported in the frame 20 by conventional means (not shown). The guide 34 also has an elongated slit 48 therein to enable light from the light 50 to pass through the slit 48 and through the transparent sheet 24 (with the image data thereon) to the plurality of photodetectors included in the array 46. The length of the array 46, the length of the slot 48, and the length of the light 50 are selected to cover the effective writing height of the ECB 12. In the embodiment described, the light 50 may be an elongated fluorescent light tube. With the arrangement shown in FIG. 1, the photodetectors in the array 46 may be positioned close to the sheet 24 to effect accurate reading of the image data on the sheet 24; this is one of the features of this invention. The guide 34 and the array 46 are actually positioned much closer to the idler roll 32 and the planar member 22 than are shown in FIG. 1; however, they are positioned as shown so as to facilitate a showing of the ECB 12.

The transparent sheet 24 is made of a plastic film material, like MYLAR, which is a trademark of E. I. DuPont de Nemours and Company, and it has a typical thickness of less than 1/32 inch in the embodiment described. The sheet 24 also has a plurality of opaque markers, like 52 and 54, which are spaced along the lower edge of the sheet as shown in FIG. 1. The markers 52 and 54 coact with the lowermost detector 46-1 of the array 46 in controlling the movement of the transparent sheet to the read station at which the array 46 is located. When a new supply roll 26 is installed in the ECB 12, for example, the PC 16 is used to energize the motor 42 to advance the strip of sheet 24 until the marker 52 is aligned with the detector 46-1. A clean portion of sheet 24 is then located at the planar member 22 for writing thereon as previously described.

When copies of the image data on the ECB 12 are to be obtained, the PC 16 is utilized as a control means for controlling the operation of the motor 42 and the array 46. When the motor 42 rotates, it moves the sheet 24 past the array 46 to effect the reading of the image data as previously described. When the sheet is moved so as to position the marker 54 adjacent to the lowermost detector 46-1 in the example being described, the system detects that the image data which was written on the sheet 24 has been read, and that a clean portion of the sheet 24 is again positioned over the planar member 22 so that the process may be repeated. The lowermost detector 46-1 may be considered a "home position detector" when used in conjunction with the markers, like 52 and 54, on the sheet 24.

Having described, generally, the construction of the ECB 12, it is now useful to describe the various physical considerations used in designing the ECB 12. As stated earlier herein, an example of an effective writing area size of the ECB 12 is 30 inches in width, with a height of 24 inches. In general, it is useful to consider the resolution of the associated printers or displays to be used in displaying the images when considering the resolution of the ECB 12. For example, a typical printer associated with a PC, to which the ECB of this invention is attached, is a wire matrix printer because this kind of printer is capable of printing a variety of characters, numbers and graphics, for example.

The printing density of a wire matrix printer is given in a particular number of dots per inch. A typical density as measured along the width of a character is 60 dots per inch (dpi). The printing density as measured in the vertical direction or along the height of a character is typically 72 dpi. A print head which is used for graphics typically has nine dot wires in the vertical direction. Assuming that the visual data on the ECB is to be printed on the area of a sheet of paper which measures 8 by 10 inches, the following relationships would be maintained. For the ECB, the number of dots per row would be equal to 8 inches×60 dots/inch or 480. Correspondingly, the number of dots per column would be equal to 10 inches×72 dots/inch or 720. The number of printed dots per page then would be equal to 480×720 or 345,600.

Continuing with the example described in the previous paragraph, if the 480×720 dots (per printed 8×10 sheet) were to be mapped on the ECB 12 which has an effective writing area of 24 inches in height by 30 inches in width, it means that the ECB 12 would have a horizontal density of 24 dpi (720 divided by 30) and a vertical density of 20 dpi (480 divided by 24). The scanning of the image data on the sheet 24 is done along a vertical axis which means that the individual detectors in the array 46 have a density of 20 sensors or detectors per inch. This density is adequate to detect any line which is drawn with typical writing instruments such as dry marking pencils.

Because there is a single vertical line of detectors or sensors in the array 46, it means that the transparent sheet 24 must be moved at a fairly constant velocity or indexed past the array 46 with sufficient samples taken to insure that there is adequate coverage in the horizontal direction. For the horizontal density of 24 dpi mentioned, it means that the horizontal distance between two successive vertical scans is 1/24 inch. In other words, the horizontal displacement of the sheet 24 is effected at a rate of one inch per second or 30 seconds for the 30 inches of effective writing area of the ECB. At this rate of movement, 11,520 data readings from the photodetectors of the array 46 will occur for each second while the sheet 24 is in motion.

When there is a request to read the image data from the ECB 12, the motor 42 is energized to rotate the take-up roll 36 and thereby move the image data on the sheet 24 past the photodetector array 46. As previously stated, there are 20 sensors or detectors per inch in the vertical direction, making a total of 480 detectors in the vertical direction. With 8 detectors per bank of detectors, it means that there are 60 banks of detectors in the array 46 in the embodiment described. The data from the array 46 may be sampled serially by banks, starting, for example, with the top-most bank of detectors as viewed in FIG. 1. While there may be some useless image data between the marker 52 and that portion of the sheet 24 which is actually over the planar member 22, this amount is exaggerated in FIG. 1 to simplify the showing as earlier explained.

If this useless data described became a problem with regard to storing the image data, for example, the image data from the array 46 would not be stored until a predetermined time lapse after the start of the movement of the sheet 24. In other applications, the storing of samples would not begin until the image data is detected. The storing of samples would be stopped when the next marker 54 reached the detector 46-1 as previously described. Because there are 60 banks of detectors with 8 detectors per bank in the embodiment described, it means that the minimum storage requirements for the uncondensed data content from one marker 52 to the next marker 54 would be 60 bytes per column×720 columns of data or 43,200 bytes of image data. This image data could be stored on a disk 56 associated with the PC 16 for subsequent retrieval and use.

The resolution just described is merely representative of a typical embodiment for the ECB 12. Naturally, different resolutions may be selected for a particular application. For example, the resolution of monochrome display screens associated with personal computers can range from 320 by 200 pixels per inch to in excess of 720 by 348, for example. Correspondingly, the resolution of color display screens associated with personal computers can range from 320 by 200 pixels per inch to well over 640 by 480, for example.

The PC 16, the option board 18, and the interface board 14 provide the means for controlling the operation of the ECB 12. The PC 16, itself, is conventional; however, it is shown in FIG. 1 in a manner which facilitates a functional showing of the various elements associated with the PC 16. These elements include a ROM 58, a RAM 60, a processor (MP) 62, keyboard (KB) 64, several interfaces 66, 68, and 70, and a general interface and control logic 72 which interconnects the various components shown. The interface 66 is used to connect the display 74 to the PC 16, and similarly, the interface 68 is associated with the printer 76 and the interface 70 is associated with the MODEM 78.

Figure 2A:
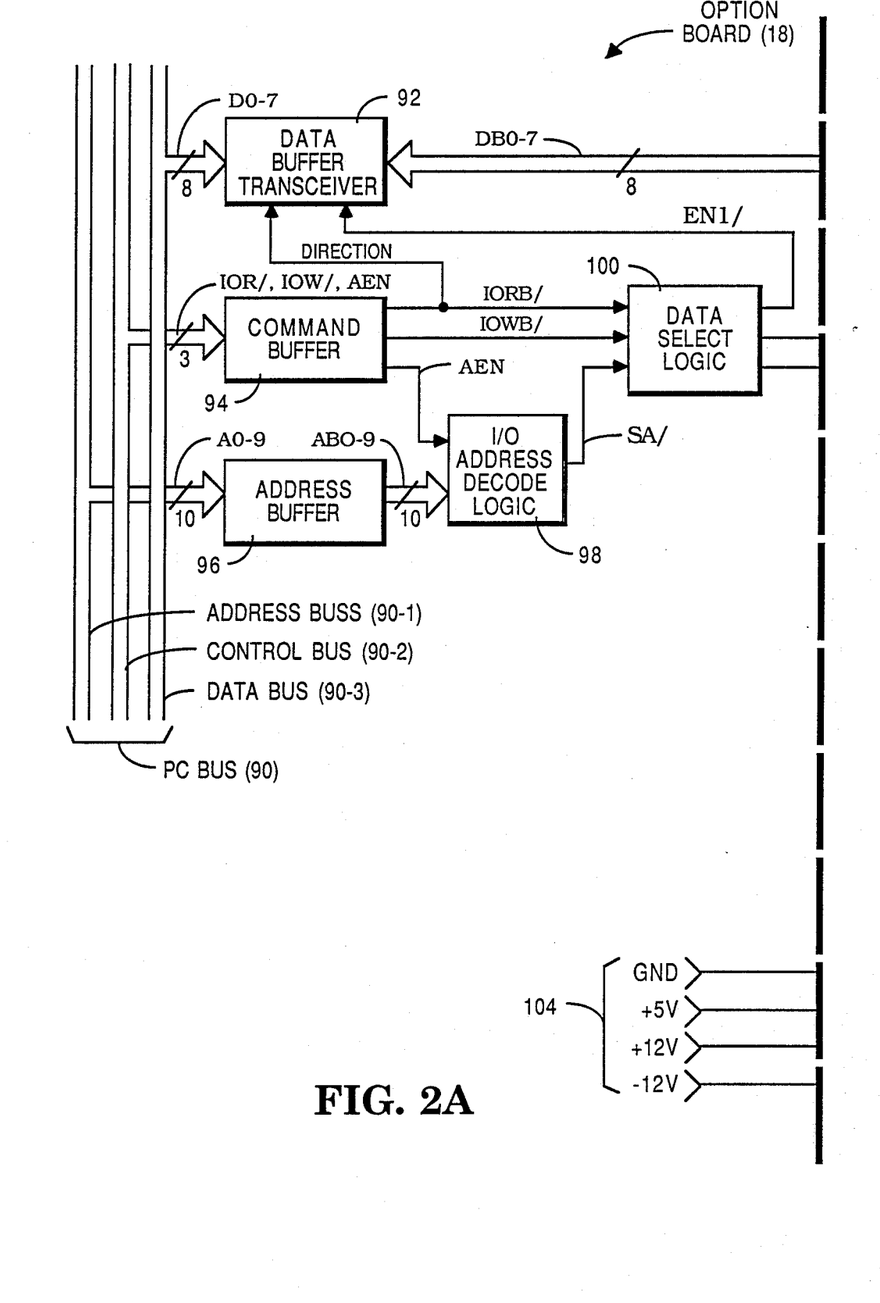
FIGS. 2A and 2B, taken together, show the option board logic and the logic included in the interface board shown in FIG. 1.
Figure 2B:
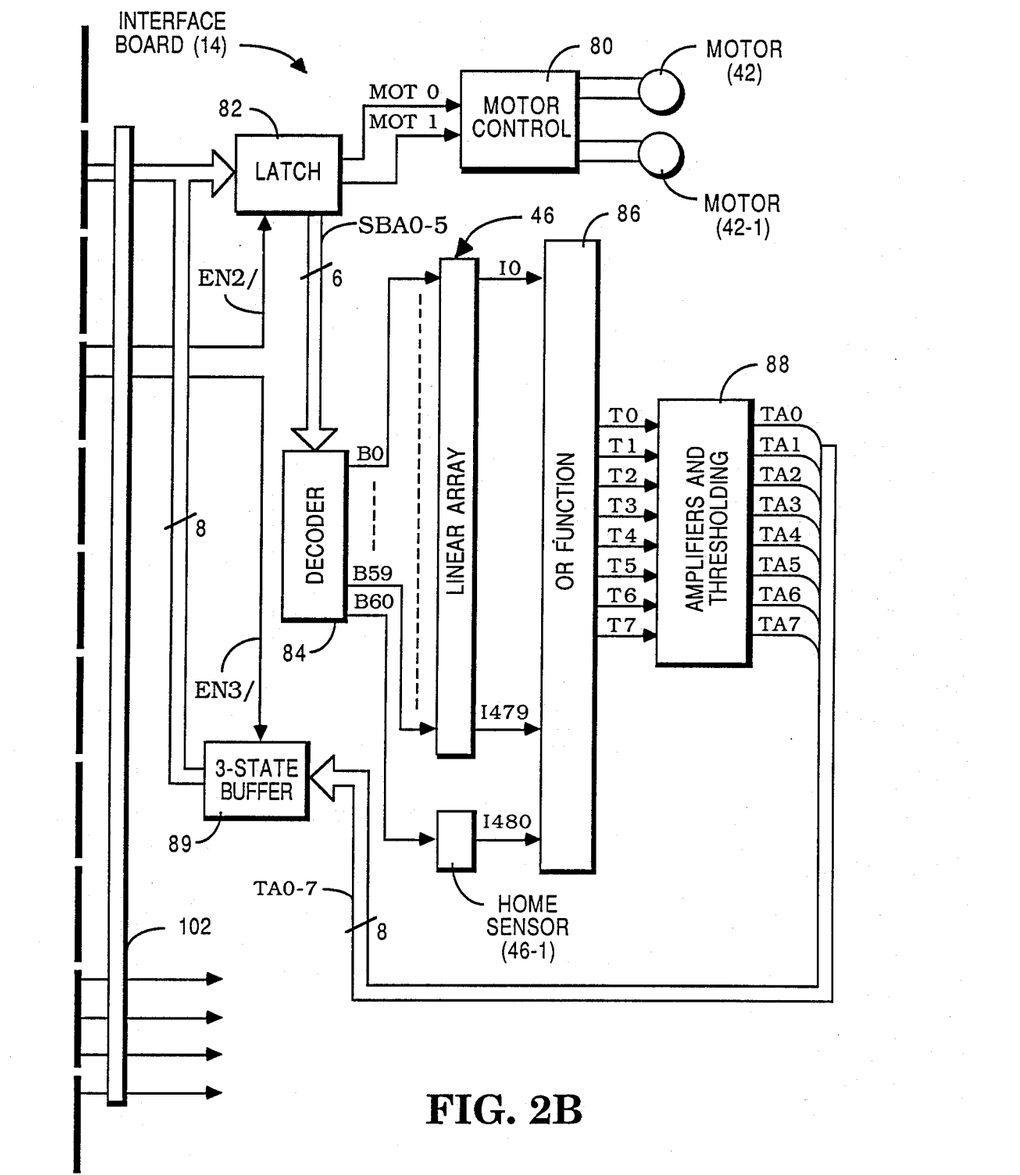

In addition to the PC 16 just described, the control means for the system 10 includes the interface board 14 alluded to earlier herein. The interface board 14 and its relationship to the option board 18 are shown in FIGS. 2A and 2B. FIG. 2A shows, essentially, the logic for the option board 18, while FIG. 2B shows the logic associated with the interface board 14.

The photodetector array 46 (FIG. 1) is shown as a linear array 46 in FIG. 2B, with the bottom most detector 46-1 being singled out to represent the home position detector as previously described. In the embodiment described, there are 60 banks of detectors in the array 46, with 8 detectors being included in each bank, making a total of 480 detectors in the vertical direction for imaging data on the transparent sheet 24. A separate detector is included for the home position sensor 46-1. The interface board 14 also includes a conventional motor control 80 which is used to control the operation of the motor 42 which drives the take-up roll 36. The motor control 80 is also used to control the operation of the motor 42-1 which rotates the supply roll 26 to rewind the transparent sheet 24 thereon. The interface board 14 also includes the latch 82, the decoder 84, the OR circuit 86, the amplifier and thresholding circuit 88, and the buffer 89 which are all conventional elements. The functioning of these elements will be described hereinafter.

The option board 18, which is coupled to the interface board 14, is shown in FIG. 2A. The cable 102 (FIG. 1) which couples the option board 18 to the interface board 14 includes the bi-directional 8 bit data lines DB0-7 and the control and power lines referenced as 104 in FIG. 2A. The PC bus 90 includes an address bus 90-1, a control bus 90-2, and a data bus 90-3. The option board 18 plugs into the standard PC bus 90 on the PC 16, with the bus 90 being shown schematically in FIG. 1. The option board 18 includes a data buffer transceiver 92, a command buffer 94, an address buffer 96, an I/O address decode logic 98, and a data select logic 100 which are all conventional components, and which are connected as shown.

The general functioning of the option board 18 is as follows. The standard bus of the PC 16 is represented logically by the PC bus 90 shown in FIG. 2A. The ten address lines A0–A9 are buffered in the address buffer 96, and correspondingly, the I/OR, I/OW, and the AEN control signals are buffered in the command buffer 94; these signals are Input Output Read, Input Output Write, and Address ENable, respectively. The buffers 94 and 96 are Octal Buffers Line Driver/Line Receivers like Signetics 74LS244, for example.

For the general explanation with regard to FIGS. 2A and 2B, certain commands are initiated by the PC 16. For example, a single function key, like "F1", on the KB 64 may be actuated by a user of the system 10 to initiate the start of the reading process after the image data on the ECB 12 is to be read and processed. The PC 16, itself, then initiates certain commands via conventional software residing in the ROM 58 or RAM 60 to control the operation of the option board 18 and the interface board 14. For example, the PC 16 initiates commands like Motor On, Motor Off, Select Home Position Sensor, and Select Bank "n" Sensor. This last command is used in an iterative process when reading the image data residing in the photodetector array 46 as will be described hereinafter.

Continuing with the general explanation, certain addresses, like 330 through 33F in hexadecimal coding, are reserved for selecting the option board 18 and indirectly, the interface board 14. These addresses appear on the A0-9 bus (FIG. 2A) when the interface board 14 is to be addressed, and they are stored in the address buffer 96. Addresses outside the range specified for the interface board 14 may be used to address the printer 76, the display 74, or the MODEM 78, for example. If the command going to the interface board 14 is a read signal, for example, the IOR/ signal will fall to a low or active level to indicate a reading operation. These IOR/ and IOW/ signals will constantly alternate in active states when read and write instructions are alternately requested of the interface board 14, for example. The command buffer 94 has two output signals, namely the IORB/ (read) signal and the IOWB/ (write) signal. The address enable (AEN) signal also coming from the command buffer 94 then activates the I/O address decode logic 98, producing an active or "low" SA/ signal at the output thereof.

Continuing with the read operation being discussed with regard to the data select logic 100 (FIG. 2A), there are three output signals, namely, EN1/, EN2/, and EN3/ coming from the data select logic 100. When data is to be read from the interface board 14, the EN1/ and EN3/ signals become active or low, and the EN2/ remains at the high or inactive level. The active EN3/ signal conditions the 3 state buffer 89 (FIG. 2B), while the active EN1/ signal conditions the data buffer transceiver 92 to accept data from the 3 state buffer 89. The "Direction" command from the command buffer 94 also conditions the data buffer transceiver 92 to transfer data from the interface board 14 to the PC 16 via the DB0-7 bus.

When a "write" instruction is to be written to the interface board 14, as for an instruction to turn on the motor 42, for example, the output EN2/ will fall to the low or active level, while the output EN3/ remains at the inactive or high level. The latch 82 (FIG. 2B) is conditioned to receive data on the DB0-7 data bus when the EN2/ signal falls to a low level. During a write operation, the data buffer transceiver 92 is conditioned to transfer data from the PC 16 to the interface board 14 by the techniques already described in relation to a read instruction. The data to be written to the interface board 14 appears on the bus DB0-7 prior to the issuance of an active or low level EN2/ signal from the data select logic 100. The output of the latch 82 is connected to the motor control 80 and the decoder 84.

The following chart illustrates the assignment of data bits on the data bus DB0-7 relative to the commands to the interface board 14:

| COMMAND | DATA BUS BITS (DB0-7) | | | | | | | | HEXADECIMAL VALUE |
|---|---|---|---|---|---|---|---|---|---|
| MOTOR OFF | 0 | 1 | X | X | X | X | X | X | 40 |
| MOTOR ON | 1 | 0 | X | X | X | X | X | X | 80 |
| SELECT BANK 0 | X | X | 0 | 0 | 0 | 0 | 0 | 0 | 00 |
| SELECT BANK 1 | X | X | 0 | 0 | 0 | 0 | 0 | 1 | 01 |
| SELECT BANK 16 | X | X | 0 | 1 | 0 | 0 | 0 | 0 | 10 |
| SELECT BANK 59 | X | X | 1 | 1 | 1 | 0 | 1 | 1 | 3B |
| SELECT HOME POSITION POSITION (Sensor 46-1) | X | X | 1 | 1 | 1 | 1 | 0 | 0 | 3C |

With regard to the above chart, the bits for the MOTOR and SELECT commands are mutually exclusive and are combined (by ORing) into a single word. The data bus bits are divided into two equal groups of bits with the right-most bit in each group of four bits being the least significant bit. The following list illustrates the hexadecimal values for some combined commands:

MOTOR ON and SELECT HOME POSITION: 80 OR 3C=BC (hexadecimal).
MOTOR OFF and SELECT HOME POSITION: 40 OR 3C=7C.
MOTOR OFF and SELECT BANK 2: 40 OR 02=42.

As stated earlier herein, there are 60 banks of light detectors in the photodetector array 46, ranging from 0 through 59 as listed in the chart shown earlier herein, with each bank having eight detectors.

With regard to the SELECT commands, the PC 16 selects the particular banks of detectors to be read prior to issuing a READ command to read the data from the selected bank of detectors in the array 46. The particular SELECT command is issued to the decoder 84 which selects the particular bank 0-59 in the array 46. The lowermost or home position detector 46-1 (FIG. 1) has the hexadecimal value of 3C as shown in the above chart.

The processing of data from each detector in the photodetector array 46 is as follows. Each detector in the array 46 (FIG. 2B) generates an analog signal which corresponds to the area or pixel being read from the transparent sheet 24. For example, the range of the signal may vary from 0 volts for a completely "black" pixel being read to 5 millivolts for a completely "white" pixel. The outputs of the detectors from a selected bank of detectors appear on the output lines T0-T7 of the OR circuit 86, which output lines are connected to the inputs of the conventional amplifier and thresholding circuit 88. The output from each detector is amplified and thresholded, conventionally, so that a binary "1" or a binary "0" appears on the corresponding one of the TA0-TA7 lines for the associated detector. The TA0--

TA7 lines from the amplifier and thresholding circuit 88 are coupled to the 3 state buffer 89. When the EN3/ signal from the data select decoder 100 becomes active or low, the data from the TA0-TA7 lines is transferred to the DB0-7 bus for transference to the PC 16 as previously described. This reading process is repeated for the remaining banks of detectors in the array 46 until all the data is read and stored in the RAM 60 of the PC 16. Once the data is stored in the RAM 60, it may be manipulated by conventional software for printing and the like as previously explained. The iterative "Write" then "Read" process alluded to earlier herein relates to selecting (or writing) and then reading the data from the detectors from the first bank (bank 0) of detectors in the array 46 and repeating the process for the remaining banks 1-59 in the embodiment described.

The motor 42 may be a stepping motor which is indexed or stepped between successive scans of image data on the transparent sheet 24 so as to move the transparent sheet 24 a distance which corresponds to the width of a pixel as measured along the length of the transparent sheet 24. Alternatively, the motor 42 may be a constant velocity motor whose speed is selected to move the sheet 24 between successive scans a distance which correspondingly amounts to the width of a pixel. The motor 42-1 may have similar characteristics, and it is used to rewind the transparent sheet 24 onto the supply roll 26.

Figure 3:
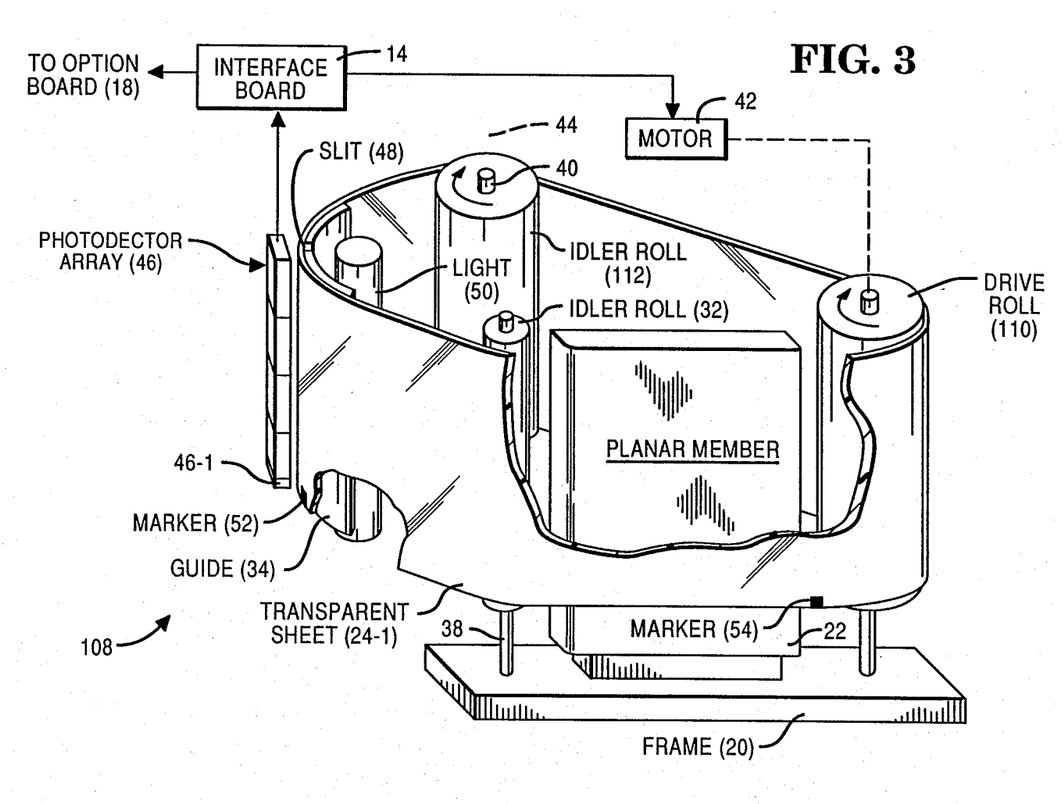
FIG. 3 is a general schematic view of a second embodiment of this invention which uses an endless transparent belt as the surface to be written upon.

The option board 18 and the interface board 14, just described in relation to the ECB 12 shown in FIG. 1, may be used with a second embodiment of the ECB of this invention designated generally as 108 and shown in FIG. 3. The principal difference between the ECB 12 and the ECB 108 is that the ECB 108 employs a transparent sheet 24-1 which is formed into an endless belt or sheet instead of being a long strip of material. When the elements shown in FIGS. 1 and 3 are the same, the same reference numerals will be used in both figures, and consequently, these common elements need not be described.

The endless sheet 24-1 is supported on the drive roll 110, the idler roll 32, the guide 34, and the idler roll 112. The motor 42 is used to rotate the drive roll 110 which moves the endless sheet 24-1 a distance equivalent to the distance between the markers 52 and 54 during a read operation as previously described. After a portion of the endless belt 34-1 has been read, the portion which was read is erased, conventionally, to ready it for subsequent use.

Figure 4:
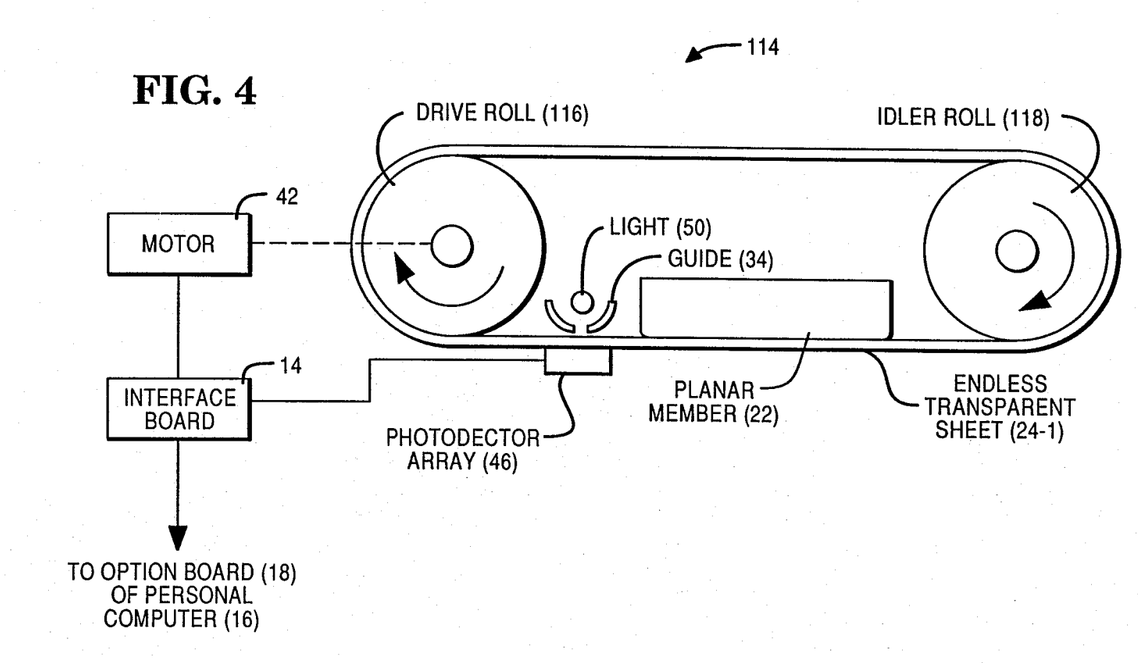
FIG. 4 is a general schematic diagram of a plan view of a third embodiment of this invention which uses an endless transparent belt as the surface to be written upon and which also employs a different position for the light and the array of photodetectors when compared to the embodiments shown in FIGS. 1 and 3.

FIG. 4 shows another ECB 114 which is essentially similar to that shown in FIG. 3; however, the light 50, guide 34, and the array are positioned closer to the planar member 22 as shown. Those elements shown in FIG. 4 which correspond to those shown in FIG. 3 are given the same reference numerals. An advantage of ECB 114 compared to the other embodiments shown herein is that the ECB 114 is more compact than the others. The motor 42 is connected to the drive roll 116 to move the transparent sheet 24-1 past the photodetector array 46 as previously described. The transparent sheet 24-1 is mounted on the drive roll 116 and the idler roll 118, and these rolls 116 and 118 are located so that the sheet 24-1 lies against the planar member 22 so as to facilitate writing thereon. The ECB 114 operates in the same general manner as that already described in relation to ECBs 10 and 108.

What is claimed is:

1. An electronic copy board comprising:

a planar member;
   a substantially transparent sheet for receiving visual data thereon, with said planar member providing a support for said substantially transparent sheet;
   a source of light and a plurality of light detectors positioned in opposed relation to said source of light;
   moving means for moving said substantially transparent sheet between said source of light and said plurality of light detectors to read the visual data on said substantially transparent sheet; and
   a guide member for guiding said substantially transparent sheet to said plurality of light detectors.

2. An electronic copy board comprising:

a planar member;
   a substantially transparent sheet for receiving visual data thereon, with said planar member providing a support for said substantially transparent sheet;
   a source of light and a plurality of light detectors positioned in opposed relation to said source of light; and
   moving means for moving said substantially transparent sheet between said source of light and said plurality of light detectors to read the visual data on said substantially transparent sheet;
   said moving means including a guide member positioned between the source of light and the plurality of light detectors to enable the substantially transparent sheet to be supported on the guide member as the sheet is moved between the source of light and the plurality of light detectors.

3. The electronic copy board as claimed in claim 2 in which said guide member has an elongated slit therein, and in which said source of light is elongated having a length which is aligned with said elongated slit.

4. The electronic copy board as claimed in claim 3 in which said transparent sheet is in the form of an endless belt having spaced markers thereon, with said markers being located on said endless belt to cooperate with at least one of said light detectors in said array so as to indicate the visual data to be read, with the visual data being located between two successive said markers.

5. The electronic copy board as claimed in claim 3 in which said electronic copy board has a height, and in which said plurality of light detectors extends along said height so as to receive the light passing through said elongated slot.

6. The electronic copy board as claimed in claim 5 in which said planar member has a smooth surface and is of a color which facilitates seeing the visual data which appears on said substantially transparent sheet.

7. The electronic copy board as claimed in claim 3 in which said moving means includes a supply roll and a take-up roll, and in which said substantially transparent sheet is in the form of a long strip which is unwound from said supply roll and is wound up on said take-up roll as said transparent sheet is moved between the source of light and the plurality of light detectors.

8. The electronic copy board as claimed in claim 7 in which said long strip has spaced markers thereon, with said markers being located on said long strip to cooperate with at least one of the light detectors in said array so as to indicate the visual data to be read, with the visual data being located between two successive said markers.

9. The electronic copy board as claimed in claim 8 in which said moving means also includes an idler roller which is positioned between said planar member and said guide member, and said moving means also includes a first motor to rotate said take-up roll and a second motor to rotate said supply roll to return said transparent sheet to a home position.

10. The electronic copy board as claimed in claim 8 in which said guide member is generally cylindrical in shape while having a generally elliptical cross section.

11. The electronic copy board as claimed in claim 10 in which said source of light is a fluorescent tube which is mounted inside said guide member.

12. An electronic copy board comprising:
   a planar member;
   a substantially transparent sheet for receiving visual data thereon, with said planar member providing a support for said substantially transparent sheet;
   a source of light and a plurality of light detectors positioned in opposed relation to said source of light; and
   moving means for moving said substantially transparent sheet between said source of light and said plurality of light detectors to read the visual data on said substantially transparent sheet;
   said moving means including an idler roll and a drive roll, and in which said substantially transparent sheet is in the form of an endless belt which is mounted on said idler and drive rolls;
   said moving means also including a guide member which is positioned between the source of light and the plurality of light detectors to enable light from the source of light to be directed at the plurality of light detectors; and
   said light guide being positioned between said planar member and said drive roll.

13. A system comprising:
   an electronic copy board comprising:
   a planar member;
   a substantially transparent sheet for receiving visual data thereon, with said planar member providing a support for said substantially transparent sheet;
   a source of light;
   reading means for reading the visual data on said substantially transparent sheet, said reading means including a plurality of light detectors positioned in opposed relation to said source of light; and
   moving means for moving said substantially transparent sheet between said source of light and said plurality of light detectors to read the visual data on said substantially transparent sheet;
   said system further comprising:
   a printer for printing at least the visual data read from said substantially transparent sheet;
   a display monitor for displaying at least the visual data read from said substantially transparent sheet; and
   control means for controlling the operation of said reading means, printer, display monitor, and said moving means;
   said moving means including a guide member positioned between the source of light and the plurality of light detectors to enable the substantially transparent sheet to be supported on the guide member as the sheet is moved between the source of light and the plurality of light detectors.

14. The system as claimed in claim 13 in which said planar member has a smooth surface and is of a color which facilitates seeing the visual data which appears on said substantially transparent sheet.

15. The system as claimed in claim 14 in which said transparent sheet is in the form of an endless belt.

16. The system as claimed in claim 15 in which said transparent sheet is in the form of an endless belt having spaced markers thereon, with said markers being located on said endless belt to cooperate with at least one of said light detectors in said array so as to indicate the visual data to be read, with the visual data being located between two successive said markers.

17. The system as claimed in claim 16 in which said moving means includes a supply roll and a take-up roll, and in which said substantially transparent sheet is in the form of a long strip which is unwound from said supply roll and is wound up on said take-up roll as said transparent sheet is moved between the source of light and the plurality of light detectors.

18. A system comprising:
   an electronic copy board comprising:
   a planar member;
   a substantially transparent sheet for receiving visual data thereon, with said planar member providing a support for said substantially transparent sheet;
   a source of light;
   reading means for reading the visual data on said substantially transparent sheet, said reading means including a plurality of light detectors positioned in opposed relation to said source of light; and
   moving means for moving said substantially transparent sheet between said source of light and said plurality of light detectors to read the visual data on said substantially transparent sheet;
   said system further comprising:
   a printer for printing at least the visual data read from said substantially transparent sheet; and
   a display monitor for displaying at least the visual data read from said substantially transparent sheet; and
   control means for controlling the operation of said reading means, printer, display monitor, and said moving means;
   said control means including a personal computer.

* * * * *